US010605207B2

(12) United States Patent
Shirai et al.

(10) Patent No.: US 10,605,207 B2
(45) Date of Patent: Mar. 31, 2020

(54) EXHAUST HEAT RECOVERY DEVICE

(71) Applicant: FUTABA INDUSTRIAL CO., LTD., Okazaki-shi, Aichi (JP)

(72) Inventors: Kunikazu Shirai, Okazaki (JP); Naohiro Takemoto, Okazaki (JP); Hirohisa Okami, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 54 days.

(21) Appl. No.: 15/760,946

(22) PCT Filed: Jan. 21, 2016

(86) PCT No.: PCT/JP2016/051709
§ 371 (c)(1),
(2) Date: Mar. 16, 2018

(87) PCT Pub. No.: WO2017/126082
PCT Pub. Date: Jul. 27, 2017

(65) Prior Publication Data
US 2018/0266367 A1 Sep. 20, 2018

(51) Int. Cl.
*F02B 47/08* (2006.01)
*F02M 26/27* (2016.01)
(Continued)

(52) U.S. Cl.
CPC ............... *F02M 26/27* (2016.02); *F01N 3/24* (2013.01); *F01N 5/02* (2013.01); *F02M 26/16* (2016.02);
(Continued)

(58) Field of Classification Search
CPC .. F02M 26/21; F02M 26/70; F02M 35/10222; F02M 26/00; F02M 26/05; F02M 26/06; F02M 26/07
(Continued)

(56) References Cited

U.S. PATENT DOCUMENTS 10,330,033 B2 * 6/2019 Hussain ............... F02D 41/0055
2007/0272480 A1 * 11/2007 Kuroda ............... B01D 53/9454
181/254

(Continued)

FOREIGN PATENT DOCUMENTS

CN 105089752 A 11/2015
JP 2008163773 A 7/2008
(Continued)

OTHER PUBLICATIONS

International Search Report for International Patent Application No. PCT/JP2016/051709 (Form PCT/ISA/210), dated Apr. 19, 2016 (2 pages).
(Continued)

*Primary Examiner* — John Kwon
(74) *Attorney, Agent, or Firm* — Withrow & Terranova, P.L.L.C.; Vincent K. Gustafson (57) ABSTRACT

An exhaust heat recovery device includes a heat exchanger that performs heat exchange between exhaust gas flowing in from a first exhaust gas conduit and a fluid as a heated object. Regarding the heat exchanger, a flow passage for the exhaust gas inside the shell is configured so that the exhaust gas flowing in from the exhaust gas inflow passage reaches a branch after contacting a plate in a division area and the exhaust gas not branched to an exhaust gas recirculation flow passage at the branch flows out to a second exhaust gas conduit after contacting a plate in a division area.

10 Claims, 8 Drawing Sheets

(51) Int. Cl.
 *F01N 3/24* (2006.01)
 *F01N 5/02* (2006.01)
 *F02M 26/16* (2016.01)
 *F02M 26/30* (2016.01)
 *F02M 26/31* (2016.01)

(52) U.S. Cl.
 CPC ........... *F02M 26/30* (2016.02); *F02M 26/31* (2016.02); *F01N 2240/02* (2013.01)

(58) Field of Classification Search
 USPC .......................... 123/568.11–568.13, 568.18
 See application file for complete search history.

(56) References Cited

U.S. PATENT DOCUMENTS

| | | | |
|---|---|---|---|
| 2015/0333245 A1 | 11/2015 | Iriyama | |
| 2017/0028813 A1* | 2/2017 | Enomoto | ........... B60H 1/00899 |
| 2018/0156143 A1* | 6/2018 | Hussain | .................. F02D 41/26 |
| 2019/0101080 A1* | 4/2019 | Garcia Gonzalez | ...... F01P 3/18 |

FOREIGN PATENT DOCUMENTS

| | | |
|---|---|---|
| JP | 2009127547 A | 6/2009 |
| JP | 2015220275 A | 12/2015 |

OTHER PUBLICATIONS

Notification of Reasons for Refusal for Japanese Patent Application No. 2017-562232 dated Oct. 30, 2018, 8 pages including English translation.

Notification of Transmittal of Translation of the International Preliminary Report on Patentability, and International Preliminary Report on Patentability (Chapter I of Patent Cooperation Treaty) for International Application No. PCT/JP2016/051709 (Forms PCT/IB/338, PCT/IB/373, and PCT/ISA/237), dated Aug. 2, 2018 (10 pages).

First Office Action for Chinese Patent Application No. 201680054743.4, dated Aug. 5, 2019, 14 pages.

* cited by examiner

EXHAUST HEAT RECOVERY DEVICE

CROSS-REFERENCE TO RELATED APPLICATION(S)

This application is a 35 U.S.C. § 371 national phase filing of International Application No. PCT/JP2016/051709 filed Jan. 21, 2016, wherein the disclosure of the foregoing application is hereby incorporated by reference herein in its entirety.

TECHNICAL FIELD

The present disclosure relates to an exhaust heat recovery device.

BACKGROUND ART

There has been proposed a device that comprises both an exhaust heat recovery function for recovering heat from exhaust gas of an internal combustion engine and an EGR cooling function for cooling exhaust gas to be recirculated by an EGR that recirculates partially exhaust gas to an intake system of the internal combustion engine (see, for example, Patent Document 1). EGR is the abbreviation for Exhaust Gas Recirculation (i.e., exhaust gas recirculation.)

According to the technology described in Patent Document 1, exhaust gas discharged from the internal combustion engine is transmitted partially or fully to a heat exchanger in response to an opening degree of a valve, so that heat recovery and exhaust gas cooling are performed. The cooled exhaust gas is recirculated partially or fully to the intake system of the internal combustion engine via a first branch in response to the position of a changeover valve. When the exhaust gas is partially recirculated to the intake system of the internal combustion engine, the rest of the exhaust gas is partially transmitted to a central pipe via a second branch and is discharged to the outside of the system.

PRIOR ART DOCUMENTS

Patent Documents

Patent Document 1: Japanese Unexamined Patent Application Publication No. 2008-163773

SUMMARY OF THE INVENTION

Problems to be Solved by the Invention

According to the technology described in Patent Document 1, at the place where the heat exchanger is mounted, the heat exchanger itself may become an obstacle and prevent exhaust gas from flowing. On the other hand, at the merging point where the second branch is merged into the central pipe, there is no obstacle that prevents reverse flow from the central pipe to the second branch.

Accordingly, when a passage from the heat exchanger to the changeover valve, the first branch, and the second branch are all interconnected by the changeover valve, exhaust gas is likely to flow in reverse from the central pipe to the second branch. More specifically, for example, when the quantity of exhaust gas supplied from the heat exchanger side is smaller than the quantity of exhaust gas drawn in to the second branch side, exhaust gas is likely to flow in reverse from the central pipe to the second branch.

In this case, the exhaust gas flowing in reverse from the central pipe to the second branch is high-temperature exhaust gas that has not passed through the heat exchanger. When this type of high-temperature exhaust gas is recirculated to the intake system of the internal combustion engine, the intake air temperature is likely to rise and the filling efficiency of the intake air is likely to become lower. That is, the exhaust gas flowing in reverse from the central pipe to the second branch may deteriorate the EGR cooling function.

In light of the foregoing, it is preferable to provide a technology that is able to inhibit deterioration of an EGR cooling function with regard to an exhaust heat recovery device combined with the EGR cooling function.

Means for Solving the Problems

An exhaust heat recovery device described below comprises a first exhaust gas conduit, a second exhaust gas conduit, a heat exchanger, a valve, and a branch. The first exhaust gas conduit is configured so that exhaust gas from an internal combustion engine flows in to its inner peripheral side. The second exhaust gas conduit is positioned at a downstream side from the first exhaust gas conduit in an exhaust gas flowing direction. The heat exchanger carries out heat exchange between the exhaust gas flowing in from the first exhaust gas conduit and a fluid as a heated object. The valve is configured to change a flow ratio between a flow rate of the exhaust gas flowing out to the second exhaust gas conduit from the first exhaust gas conduit not being subjected to the heat exchanger and a flow rate of the exhaust gas flowing in to the heat exchanger from the first exhaust gas conduit. The branch branches the exhaust gas subjected to the heat exchange with the fluid by the heat exchanger partially or fully to an exhaust gas recirculation flow passage that recirculates the exhaust gas to an intake system of the internal combustion engine.

The heat exchanger comprises a plurality of plates and a shell. The plurality of plates is respectively configured to be annular and is arranged at positions surrounding an outer periphery of the first exhaust gas conduit. The shell is provided at a position surrounding the outer periphery of the first exhaust gas conduit and houses the plurality of plates therein. A flow passage for the fluid as the heated object is configured inside the plurality of plates so that the fluid is supplied to the insides of the respective plates via a fluid supply passage and the fluid is discharged from the insides of the respective plates via a fluid discharge passage. The heat exchanger is configured so that, at a place inside of the shell and outside of the plurality of plates, the exhaust gas flows in from the first exhaust gas conduit via an exhaust gas inflow passage and flows out to the second exhaust gas conduit via an exhaust gas outflow passage.

In such exhaust heat recovery device, the inside of the shell is divided into a plurality of division areas, each of the division areas housing at least one of the plurality of plates therein, and a flow passage for the exhaust gas inside the shell is configured so that the exhaust gas flowing in from the exhaust gas inflow passage reaches the branch after contacting the plate in at least one of the plurality of division areas and the exhaust gas not branched to the exhaust gas recirculation flow passage at the branch flows out to the second exhaust gas conduit after contacting the plate in at least one of the plurality of division areas.

According to the exhaust heat recovery device configured as described above, it is possible to let the exhaust gas flow in from the first exhaust gas conduit to the heat exchanger via the exhaust gas inflow passage by adjusting an opening degree of the valve. Inside the shell, heat is transmitted between the exhaust gas and the fluid via the plates, and hence heat recovery (i.e., fluid heating) and exhaust gas cooling are achieved. The recovered heat may be used for any purposes. For example, such recovered heat may be utilized as a warming-up for the internal combustion engine or various devices accompanied therewith (for example, a catalyst device to purify exhaust gas, and a transmission), heat source for a heater, and the like. The cooled exhaust gas is supplied, partially or fully as needed, to the exhaust gas recirculation flow passage side from the branch. When a part of the exhaust gas is supplied to the exhaust gas recirculation flow passage side, the rest of the exhaust gas flows out to the second exhaust gas conduit via the exhaust gas outflow passage and is discharged outside the system afterwards.

In the case where the above-described exhaust gas outflow passage is provided, when the amount of exhaust gas supplied to the inside of the shell via the exhaust gas inflow passage becomes too small relative to the amount of exhaust gas supplied to the exhaust gas recirculation flow passage side, there is a possibility that high-temperature exhaust gas may flow in reverse from the second exhaust gas conduit 12 to the inside of the shell via the exhaust gas outflow passage. However, in the above-described exhaust heat recovery device, the flow passage of the exhaust gas inside the shell is configured so that the exhaust gas not branched to the exhaust gas recirculation flow passage at the branch flows out to the second exhaust gas conduit after contacting the plates in at least one of the division areas.

Therefore, even if the high-temperature exhaust gas flows in reverse to the inside of the shell from the second exhaust gas conduit via the exhaust gas outflow passage, such exhaust gas reaches the branch after contacting the plates in at least one of the division areas. Therefore, even if the exhaust gas is the exhaust gas flowing in reverse via the exhaust gas outflow passage, the exhaust gas is cooled through the heat exchanger in association with the contact with the plates. Therefore, it is possible to inhibit high-temperature exhaust gas that has not been cooled through the heat exchange from flowing in to the exhaust gas recirculation flow passage. The increase in the intake air temperature is hence inhibited, and the reduction in the filling efficiency of the intake air is also inhibited. That is, it is possible to inhibit the damage to the EGR cooling function of the heat exchanger caused by the reverse flow of the exhaust gas via the exhaust gas outflow passage.

In the above-described exhaust heat recovery device, the inside of the shell may be divided into two division areas by a partition arranged approximately perpendicularly to an axial direction of the first exhaust gas conduit. Alternatively, in the above-described exhaust heat recovery device, the inside of the shell may be divided into two division areas by a partition arranged approximately in parallel to the axial direction of the first exhaust gas conduit.

According to the above-described configurations, the inside of the shell is divided into the two division areas. Compared with the case where the inside of the shell is divided into more division areas, the shape of the flow passage inside the shell does not get complicated in vain, and hence the flow passage resistance inside the shell is reduced. Further, compared with the case where the inside of the shell is divided into more division areas, the structure of the inside of the shell is simplified. As a result, the number of components is reduced, and the productivity of the exhaust heat recovery device is improved.

As a configuration different from the above-described exhaust heat recovery device, a configuration described below is adopted. That is, an exhaust heat recovery device described below comprises a first exhaust gas conduit, a heat exchanger, a valve, and a branch. The heat exchanger carries out heat exchange between the exhaust gas flowing in from the first exhaust gas conduit and a fluid as a heated object. The valve is configured to change a flow ratio between a flow rate of the exhaust gas flowing out to the second exhaust gas conduit from the first exhaust gas conduit not being subjected to the heat exchanger and a flow rate of the exhaust gas flowing in to the heat exchanger from the first exhaust gas conduit. The branch branches the exhaust gas subjected to the heat exchange with the fluid by the heat exchanger partially or fully to an exhaust gas recirculation flow passage that recirculates the exhaust gas to an intake system of the internal combustion engine.

The heat exchanger comprises a plurality of plates and a shell and is configured as a so-called shell and plate type heat exchanger. The plurality of plates is respectively configured to be annular and is arranged at positions surrounding an outer periphery of the first exhaust gas conduit. The shell is provided at a position surrounding the outer periphery of the first exhaust gas conduit and houses the plurality of plates therein. Accordingly, the entire of the heat exchanger is configured in a cylindrical shape surrounding the outer periphery of the first exhaust gas conduit. A flow passage for the fluid as the heated object is configured inside the plurality of plates so that the fluid is supplied to insides of the respective plates via a fluid supply passage and the fluid is discharged from the insides of the respective plates via a fluid discharge passage. The heat exchanger is configured so that, at a place inside of the shell and outside of the plurality of plates, the exhaust gas flows in from the first exhaust gas conduit via an exhaust gas inflow passage and flows out to the second exhaust gas conduit via an exhaust gas outflow passage.

These configurations are the same as the configuration of the first described exhaust heat recovery device. Therefore, also in this exhaust heat recovery device, heat recovery and exhaust gas cooling are achieved in the same manner as the first described exhaust heat recovery device. In this exhaust heat recovery device, the exhaust gas outflow passage is configured so that a flow passage resistance of the exhaust gas outflow passage is higher than a flow passage resistance of the exhaust gas inflow passage. Accordingly, a reverse flow of high-temperature exhaust gas from the second exhaust gas conduit to the inside of the shell via the exhaust gas outflow passage is unlikely to be caused. Even if there is such reverse flow, the amount of the exhaust gas flowing in reverse becomes smaller than the amount of exhaust gas flowing in to the inside of the shell via the exhaust gas inflow passage.

Therefore, even if there is a reverse flow of the exhaust gas, inside of the shell, a percentage of the exhaust gas that flowed in through the exhaust gas inflow passage and passed through the heat exchanger becomes large and a percentage of the exhaust gas that flowed in through the exhaust gas outflow passage and has not passed through the heat exchanger becomes small. Therefore, by adjusting the flow passage resistances of the exhaust gas inflow passage and the exhaust gas outflow passage and optimizing the balance, it is possible to inhibit the high-temperature exhaust gas not subjected to the heat exchanger from flowing excessively into the exhaust gas recirculation flow passage. As a result, it is possible to suppress the increase in the intake air temperature and the reduction in the filling efficiency of the intake air. That is, it is possible to inhibit the damage to the EGR cooling function of the heat exchanger caused by reverse flow of the exhaust gas via the exhaust gas outflow passage.

EXPLANATION OF REFERENCE NUMERALS 1, 2, 3 . . . exhaust heat recovery device, 11 . . . first exhaust gas conduit, 13 . . . heat exchanger, 15 . . . branch, 17 . . . fluid supply passage, 19 . . . fluid discharge passage, 21 . . . second exhaust gas conduit, 23 . . . exhaust gas recirculation flow passage, 25 . . . plate, 27 . . . shell, 27A . . . cylindrical portion, 31 . . . exhaust gas inflow passage, 33 . . . exhaust gas outflow passage, 35A, 35B . . . partition, 37A . . . front-side division area, 37B . . . rear-side division area, 37C . . . left-side division area, 37D . . . right-side division area, 39 . . . flow passage changeover valve, 41 . . . cushioning member, 43 . . . EGR valve, 45 . . . communication passage, 47 . . . first partition wall, 49 . . . second partition wall, 51, 52 . . . openings, 53, 54 . . . opening, 55, 56 . . . clearance, 59 . . . baffle plate, 61 . . . space.

Mode For Carrying Out The Invention

Next described below are exemplary embodiments of the above-described exhaust heat recovery device.

(1) First Embodiment

Figure 1:
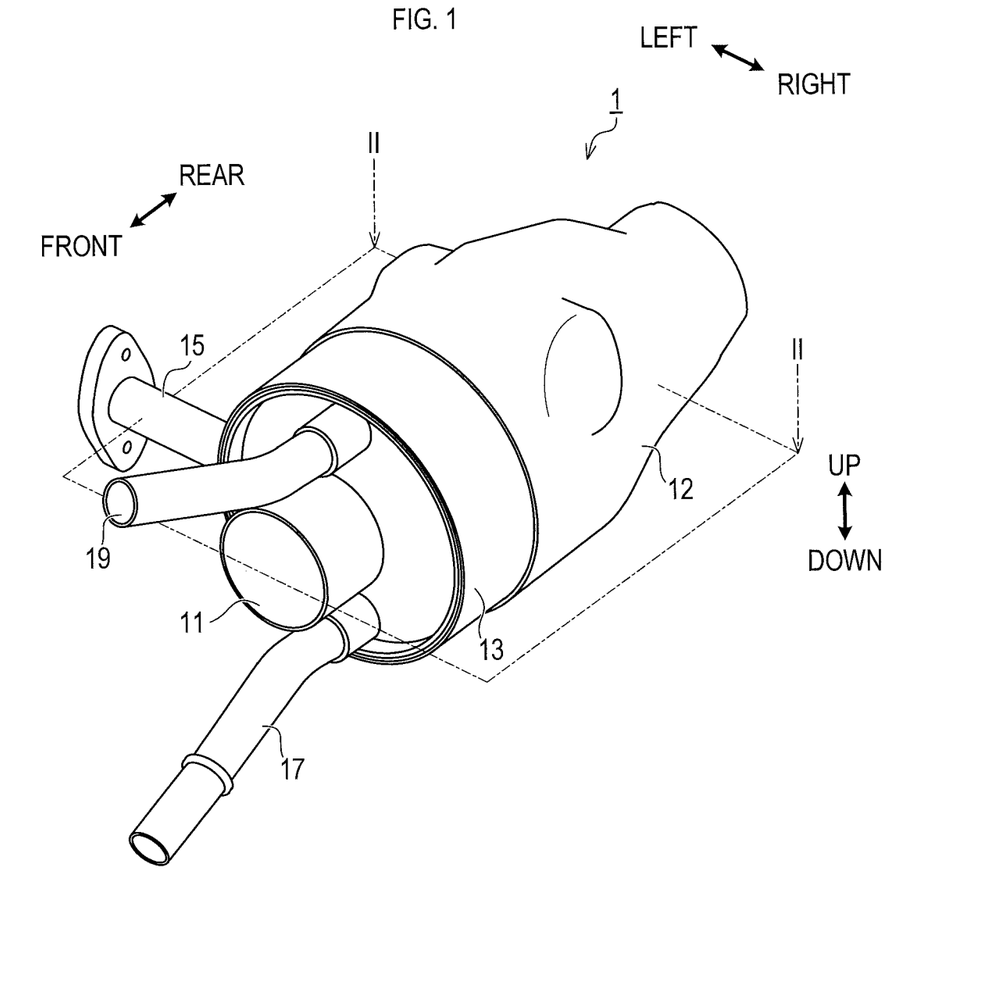
FIG. 1 is a perspective view illustrating an exhaust heat recovery device according to a first embodiment.

The first embodiment will be first described. An exhaust heat recovery device 1 illustrated in FIG. 1 is a device that is mounted on a movable body (e.g., automobile and the like) having an internal combustion engine and is provided with an exhaust heat recovery function for recovering heat from exhaust gas discharged from the internal combustion engine. This exhaust heat recovery device 1 is a device combined with an EGR cooling function for cooling exhaust gas to be recirculated in an EGR that recirculates a part of the exhaust gas to an intake system of the internal combustion engine The following description will be made by use of front, rear, left, right, up, and down directions included in the drawing sheets when needed. These directions are defined relative to each other regarding the exhaust heat recovery device 1 in FIG. 1 in which, for the six views wherein a view looking at the exhaust heat recovery device 1 from the upstream side in the flowing direction of the exhaust gas to the exhaust heat recovery device 1 appears in the front view, the direction in which a portion appearing in the front view is oriented is the front, the direction in which a portion appearing in the rear view is oriented is the rear, the direction in which a portion appearing in the left-side view is oriented is the left, the direction in which a portion appearing in the right-side view is oriented is the right, the direction in which a portion appearing in the plain view is oriented is up, and the direction in which a portion appearing in the bottom view is oriented is down. However, these directions are defined in order to simply describe the relative positional relationship of the portions configuring the exhaust heat recovery device 1. Therefore, for example, when the exhaust heat recovery device 1 is mounted on the movable body, it is arbitrary how the exhaust heat recovery device 1 is inclined relative to the movable body.

As illustrated in FIG. 1, the exhaust heat recovery device 1 has a first exhaust gas conduit 11, a second exhaust gas conduit 12, a heat exchanger 13, and a branch 15. The first exhaust gas conduit 11 is a tubular member configuring a flow passage that introduces exhaust gas to the inside of the exhaust heat recovery device 1. This first exhaust gas conduit 11 is coupled, at one end (front end in FIG. 1), to a member (not illustrated) configuring a flow passage at the upstream side in the exhaust gas flowing direction. The configuration is made so that the exhaust gas from the internal combustion engine flows in to the inner peripheral side. The second exhaust gas conduit 12 is a member configuring a flow passage at the downstream side in the exhaust gas flowing direction as viewed from the first exhaust gas conduit 11.

The heat exchanger 13 is a device that performs heat exchange between the exhaust gas flowing in from the first exhaust gas conduit 11 and a fluid that is a heated object (e.g., coolant, oil, and the like.) This heat exchanger 13 is configured its entirety in an approximately cylindrical shape and is mounted at a position surrounding an outer periphery of the first exhaust gas conduit 11. The heat exchanger 13 is provided, at one end (front end in FIG. 1), with a fluid supply passage 17, which allows the fluid as the heated object to flow in, and a fluid discharge passage 19 which allows the fluid heated by the heat exchanger 13 to flow out. The heat exchanger 13 is connected, at the other end (rear end in FIG. 1) to the second exhaust gas conduit 12.

Figure 2:
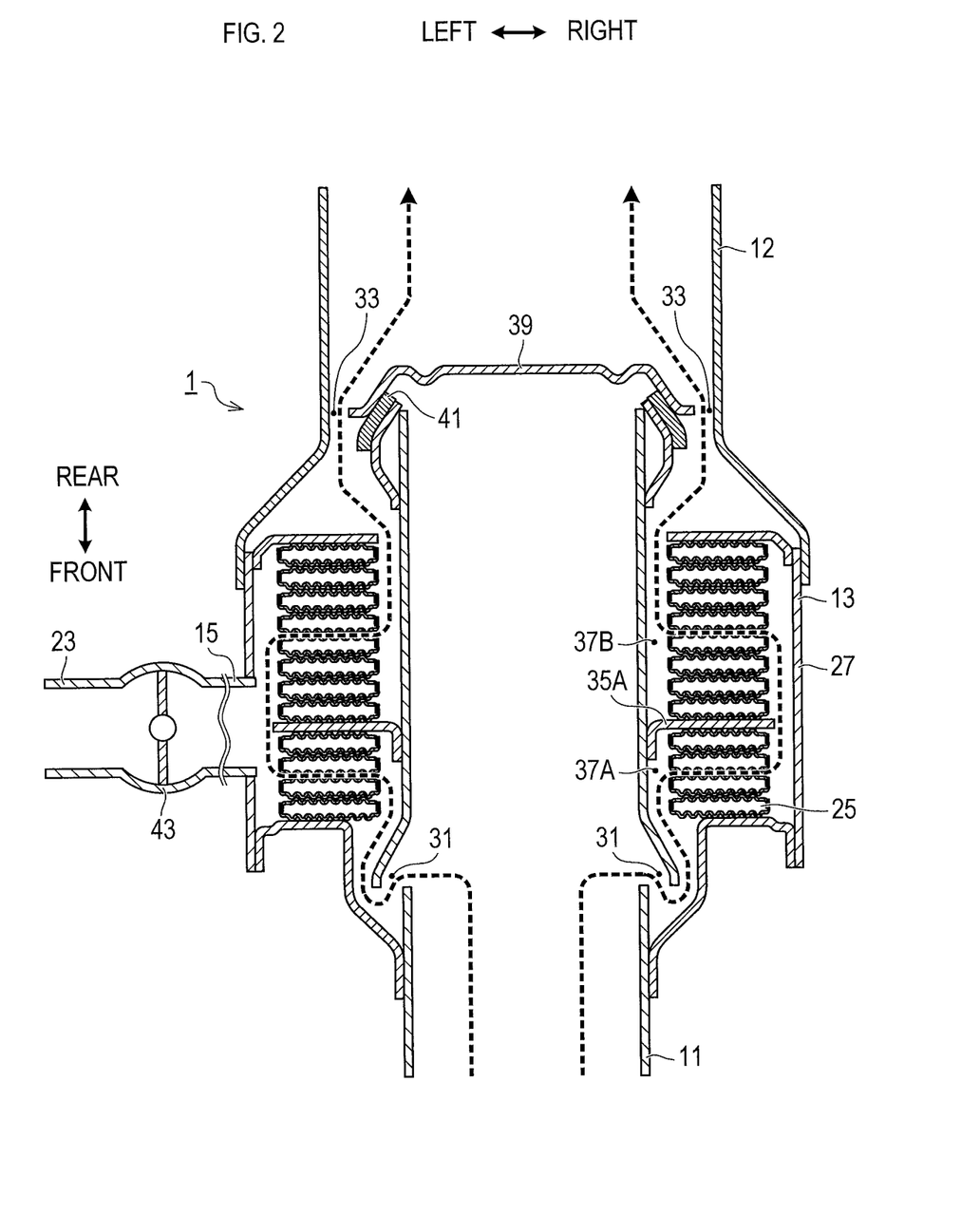
FIG. 2 is a cross sectional view illustrating the exhaust heat recovery device of the first embodiment cut horizontally with a flow passage changeover valve and an EGR valve both being closed.

The branch 15 is configured with a tubular material and extends in a centrifugal direction (to the left in FIG. 1) from the outer peripheral surface of the heat exchanger 13. As illustrated in FIG. 2, the branch 15 is connected to a member configuring an exhaust gas recirculation flow passage 23 that recirculates a part of the exhaust gas to the intake system (i.e., to a flow passage wherein air supplied to the internal combustion engine flows) of the internal combustion engine. Accordingly, exhaust gas subjected to heat exchange with the fluid by the heat exchanger 13 is branched partially or fully to the exhaust gas recirculation flow passage 23. FIG. 2 is a view illustrating a cutaway view of the exhaust heat recovery device 1 that was cut with a horizontal cutting surface denoted with an alternate long and short dash line in FIG. 1 and viewed from a direction denoted by arrows II-II in FIG. 1. In FIG. 2, the exhaust gas recirculation flow passage 23 is schematically illustrated with a partially broken line.

The heat exchanger 13 is a so-called shell and plate type heat exchanger and comprises a plurality of plates 25 (herein, twelve pieces) and a shell 27. The plurality of plates 25 is a place where heat exchange is carried out in the heat exchanger 13. The plurality of plates 25 is configured of a material having high thermal conductivity (for example, metal such as stainless steel, aluminum alloy, copper alloy) and each of the plates 25 is in an annular and hollow shape. More specifically, each plate 25 is configured in a manner that a pair of annular metal plates each having a recess surface is jointed with each other in a direction wherein the recess surfaces face each other. As a result, the space defined between the recess surfaces of each plate 25 shape the hollow.

The first exhaust gas conduit 11 is inserted into the inner periphery of the plurality of plates 25, and the plurality of plates 25 is arranged in an axial direction (in the front and rear direction in FIG. 2) of the first exhaust gas conduit 11 at a position surrounding the outer periphery of the first exhaust gas conduit 11. By use of the hollow of each plate 25, flow passages for the fluid as the heated object are configured inside the plurality of plates 25. More specifically, the hollows of the plates 25 adjacent to each other communicate with each other via a pair of flow passages. One of the pair of flow passages is connected to the above-mentioned fluid supply passage 17, and the other one thereof is connected to the above-mentioned fluid discharge passage 19. Accordingly, it is configured so that the fluid is supplied to the inside of each plate 25 via the fluid supply passage 17 and is discharged from the inside of each plate 25 via the fluid discharge passage 19.

The shell 27 configures the exterior of the heat exchanger 13. The shell 27 is arranged at a position surrounding the outer periphery of the first exhaust gas conduit 11 and houses the plurality of plates 25 therein. A space that corresponds to the inside of the shell 27 and the outside of the plurality of plates 25 is configured such that the exhaust gas is allowed to flow in from the first exhaust gas conduit 11 to the space via an exhaust gas inflow passage 31. The exhaust gas inflow passage 31 is a through hole that penetrates between the outer peripheral side of the first exhaust gas conduit 11 and the inner peripheral side thereof at a part of the first exhaust gas conduit 11. The inside of the shell 27 communicates with the inner peripheral side of the first exhaust gas conduit 11 via this through hole. According to the first embodiment, the exhaust gas inflow passage 31 is formed by cutting and raising a part of the first exhaust gas conduit 11 to the outer peripheral side. However, it is optional whether the exhaust gas inflow passage 31 is formed by this type of cutting and raising work.

The space that corresponds to the inside of the shell 27 and the outside of the plurality of plates 25 is configured such that the exhaust gas is allowed to flow out from the space to the inner peripheral side of the second exhaust gas conduit 12 via an exhaust gas outflow passage 33. The exhaust gas outflow passage 33 is configured by providing a clearance between the shell 27 and the first exhaust gas conduit 11 at an end (rear end in FIG. 2) of the shell 27. The inside of the shell 27 communicates with the inner peripheral side of the second exhaust gas conduit 12 via this clearance.

The inside of the shell 27 is divided into a plurality of division areas 37A and 37B by a partition 35A. According to the first embodiment, the partition 35A has a wall surface arranged approximately perpendicular to the axial direction (front and rear direction in FIG. 2) of the first exhaust gas conduit 11. The inside of the shell 27 is divided into two division areas 37A and 37B by this partition 35A. This partition 35A is formed in an annular shape having an outer diameter greater than the outer diameter of the plate 25 and an inner diameter smaller than the inner diameter of the plate 25. The inner periphery of the partition 35A is joined to the outer peripheral surface of the first exhaust gas conduit 11 with no gap therebetween. On the other hand, there is a clearance between the outer periphery of the partition 35A and the inner surface of the shell 27. Accordingly, the two division areas 37A and 37B communicate with each other at the outer peripheral side of the partition 35A.

At least one plate 25 out of the plurality of plates 25 is arranged in each of the division areas 37A and 37B. More specifically, according to the first embodiment, there are four plates 25 arranged in the division area 37A (front-side division area in FIG. 2, hereinafter referred to as the front-side division area 37A). There are eight plates 25 arranged in the division area 37B (rear-side division area in FIG. 2, hereinafter referred to as the rear-side division area 37B). The exhaust gas inflow passage 31 allows the exhaust gas to flow in to the inner peripheral side of the plates 25 in the front-side division area 37A. The exhaust gas outflow passage 33 allows the exhaust gas to flow out from the inner peripheral side of the plates 25 in the rear-side division area 37B.

As the above-described flow passage is configured in the shell 27, the exhaust gas flowing in from the exhaust gas inflow passage 31 flows in the shell 27 as denoted by an arrowed broken line in FIG. 2. That is, the exhaust gas flowing in from the exhaust gas inflow passage 31 flows from the inner peripheral side of the plates 25 to the outer peripheral side thereof in the front-side division area 37A. At this time, the exhaust gas reaches branch 15 after contacting plates 25. The exhaust gas not branched to the exhaust gas recirculation flow passage 23 at the branch 15 flows from the outer peripheral side of plates 25 to the inner peripheral side thereof in the rear-side division area 37B. The exhaust gas then reaches the exhaust gas outflow passage 33 after contacting plates 25 and flows out to the inner peripheral side of the second exhaust gas conduit 12 via the exhaust gas outflow passage 33.

A flow passage changeover valve 39 (corresponding to an example of a valve in this specification) is provided in the vicinity of the end of the first exhaust gas conduit 11 (near the rear end in FIG. 2). This flow passage changeover valve 39 has a lower end that is configured to oscillate in directions to displace rearward and upward about a rotational center of an axis (not illustrated) extending in the right and left direction at the upper end side of the flow passage changeover valve 39. The flow passage changeover valve 39 thus opens and closes an opening at the end (rear end in FIG. 2) of the first exhaust gas conduit 11. Provided at the other end of the first exhaust gas conduit 11 is a cushioning member 41 configured with a material having heat resistance and shock absorbing performance (e.g., metal mesh and the like). The flow passage changeover valve 39 is configured to come in contact with the cushioning member 41 when the flow passage changeover valve 39 is closed.

Adjustment of the opening degree of the flow passage changeover valve 39 makes it possible to change a flow ratio between a flow rate of the exhaust gas flowing out to the second exhaust gas conduit 12 from the first exhaust gas conduit 11 not through the heat exchanger 13 and a flow rate of the exhaust gas flowing out to the heat exchanger 13 from the first exhaust gas conduit 11. The flow rates F1 and F2, which are respectively the rate of the exhaust gas flowing in to the heat exchanger 13 and the rate of the exhaust gas not flowing thereto, are switched at flow ratio F1:F2 that falls within a range between 0:100 and 100:0. The flow ratio may be switched in two steps (i.e., full open and full closed) or may be switched in multiple steps including other steps between the full open and the full closed or in a stepless manner. The flow rate F1 may be designed to be equal to or greater than the minimum value x1. The flow rate F2 may be designed to be equal to or greater than the minimum value x2. That is, the flow ratio F1:F2 may be switched within a range between x1:(100−x1) and 100:0 or within a range between 0:100 and (100−x2):x2. Further, the flow ratio F1:F2 may be switched within a range between x1:(100−x1) and (100−x2):x2, and the like.

FIG. 2 also illustrates an EGR valve 43 provided in the exhaust gas recirculation flow passage 23. The EGR valve 43 is configured to open when the exhaust gas is recirculated to the intake system of the internal combustion engine and the opening degree is adjusted. When the exhaust gas recirculation is not carried out, the EGR valve 43 is closed. The steps of the opening degrees of the EGR valve 43 may be designed arbitrarily in the same manner as the above described flow passage changeover valve 39.

Regarding the exhaust heat recovery device 1 configured as described above, the adjustment of the opening degree of the flow passage changeover valve 39 makes it possible to increase and decrease the flow rate of the exhaust gas flowing in to the heat exchanger 13 from the first exhaust gas conduit 11 via the exhaust gas inflow passage 31. Under the condition wherein exhaust heat has been recovered actively, for example, when the internal combustion engine starts up, the flow passage changeover valve 39 is closed as illustrated in FIG. 2. In this case, almost all of the exhaust gas flowing in to the inner peripheral side of the first exhaust gas conduit 11 flows in to the heat exchanger 13 from the first exhaust gas conduit 11 via the exhaust gas inflow passage 31.

Here, heat transmission is carried out via the plates 25 between the exhaust gas flowing outside the plates 25 and the fluid flowing inside the plates 25. Accordingly, heat recovery (i.e., fluid heating) and exhaust gas cooling are realized. Although not illustrated, such recovered heat may be utilized in any applications, for example, as a warming-up for the internal combustion engine or various devices accompanied thereto (e.g., catalyst device to purify exhaust gas, transmission), heat source for a heater, and the like.

Figure 3A:
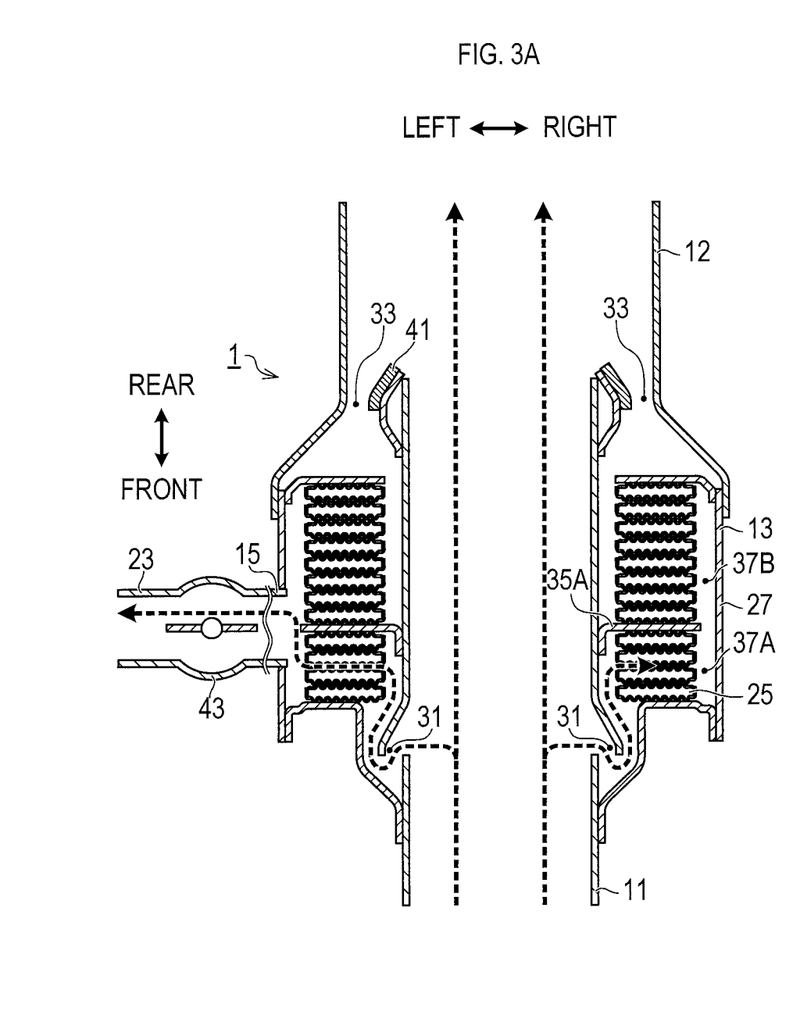
FIG. 3A is a cross sectional view illustrating the exhaust heat recovery device of the first embodiment cut horizontally with the flow passage changer valve and the EGR valve both being open.

Meanwhile, under the condition wherein the exhaust gas is intended to be supplied to the exhaust gas recirculation flow passage 23, the EGR valve 43 is opened as illustrated in FIG. 3A. Here, the opening degree of the flow passage changeover valve 39 is adjusted so that the exhaust gas flows in to the heat exchanger 13 at an appropriate amount in response to the amount of exhaust gas flowing in to the first exhaust gas conduit 11. FIG. 3A illustrates the flow passage changeover valve 39 being open, as an example. When the EGR valve 43 is open, as denoted with an arrowed broken line in FIG. 3A, the exhaust gas cooled thorough the heat exchange by the heat exchanger 13 is supplied, partially or fully as needed, to the exhaust gas recirculation flow passage 23 via the branch 15.

In this case, the heat exchanger 13 functions as an EGR cooler. Therefore, it is possible to suppress increase in the intake air temperature, and thus it is possible to inhibit decrease in filling efficiency of the intake air. When the flow passage changeover valve 39 is open, the exhaust gas not flowing in to the heat exchanger 13 flows out to the second exhaust gas conduit 12 directly from the first exhaust gas conduit 11. Although not illustrated in FIG. 3A, according to the opening degree of the EGR valve 43 or the flow rate of the exhaust gas flowing in via the exhaust gas inflow passage 31, the exhaust gas may be supplied only partially to the exhaust gas recirculation flow passage 23. In this case, the rest of the exhaust gas flows out to the inner peripheral side of the second exhaust gas conduit 12 via the exhaust gas outflow passage 33.

Figure 3B:
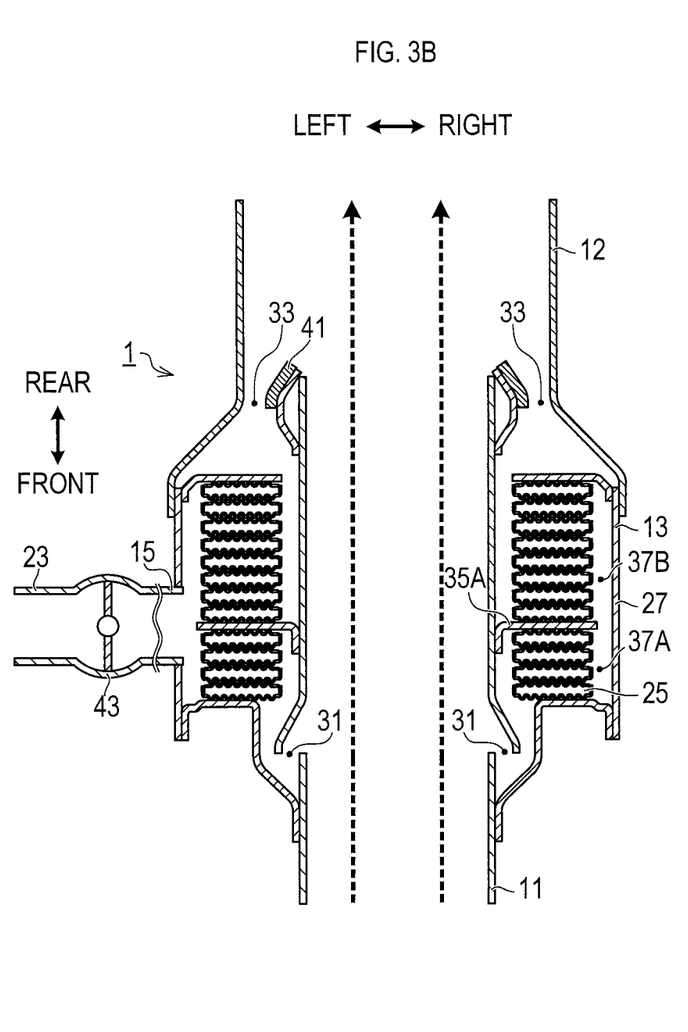
FIG. 3B is a cross sectional view illustrating the exhaust heat recovery device of the first embodiment cut horizontally with the flow passage changer valve being open and the EGR valve being closed.

Further, under the condition wherein the exhaust gas is not supplied to the exhaust gas recirculation flow passage 23 and heat recovery from the exhaust heat is not necessary, as illustrated in FIG. 3B, the EGR valve 43 is closed and the flow passage changeover valve 39 is opened. In this case, the almost all amount of the exhaust gas flowing in to the inner peripheral side of the first exhaust gas conduit 11 flows out directly from the first exhaust gas conduit 11 to the second exhaust gas conduit 12. In this case, because exhaust heat is not recovered at the heat exchanger 13, it is possible to inhibit recovering excessive heat when the warming-up and the like are not needed.

When the amount of exhaust gas supplied to the inside of the shell 27 via the exhaust gas inflow passage 31 becomes too small relative to the amount of exhaust gas supplied to the exhaust gas recirculation flow passage 23, there is a possibility that high-temperature exhaust gas may flow in reverse from the second exhaust gas conduit 12 to the inside of the shell 27 via the exhaust gas outflow passage 33. However, in the above-described exhaust heat recovery device 1, the flow passage of the exhaust gas inside the shell 27 is configured so that the exhaust gas not branched to the exhaust gas recirculation flow passage 23 at the branch 15 flows out to the second exhaust gas conduit 12 after contacting the plates 25 in the rear-side division area 37B.

Therefore, even if the high-temperature exhaust gas flows in reverse to the inside of the shell 27 from the second exhaust gas conduit 12 via the exhaust gas outflow passage 33, such exhaust gas reaches the branch 15 after contacting the plates 25 in the rear-side division area 37B. Therefore, even if the exhaust gas is the exhaust gas flowing in reverse via the exhaust gas outflow passage 33, the exhaust gas is cooled through the heat exchange in association with the contact with the plates 25. Therefore, it is possible to inhibit high-temperature exhaust gas that has not been cooled through the heat exchanger from flowing in to the exhaust gas recirculation flow passage 23. The increase in the intake air temperature is hence inhibited, and the reduction in the filling efficiency of the intake air is also inhibited. That is, it is possible to inhibit the damage to the EGR cooling function of the heat exchanger 13 due to the reverse flow of the exhaust gas via the exhaust gas outflow passage 33.

Regarding the above-described exhaust heat recovery device 1, the inside of the shell 27 is divided into the two division areas 37A and 37B. Compared with the case where the inside of the shell 27 is divided into more division areas 37A and 37B, the shape of the flow passage of the inside of the shell 27 does not get complicated in vain, and hence the flow passage resistance inside the shell 27 is reduced. Further, compared with the case where the inside of the shell 27 is divided into more division areas 37A and 37B, the structure of the inside of the shell 27 is simplified. As a result, the number of the partition 35A does not increase in vain, the number of components is reduced, and the productivity of the exhaust heat recovery device 1 is improved.

Regarding the above-described exhaust heat recovery device 1, the heat exchanger 13 is entirely formed in an approximately cylindrical shape and is arranged coaxially about the first exhaust gas conduit 11. Therefore, unlike when the heat exchanger is provided somewhere not coaxial with the equivalent to the first exhaust gas conduit, there is no need to arrange pipes as flow passages between the equivalent to the first exhaust gas conduit and the heat exchanger. Further, there is no need to assure the place to arrange the heat exchanger somewhere different from the place where the equivalent to the first exhaust gas conduit is arranged. Accordingly, the exhaust heat recovery device 1 shows high mountability to the movable body and is able to be mounted even in a smaller space.

Regarding the above-described exhaust heat recovery device 1, in order to determine the position of the branch 15, there is no need to consider the possibility of the reverse flow of the high-temperature exhaust gas from the exhaust gas outflow passage 33 and there is a high degree of freedom to determine the position of the branch 15. Accordingly, for example, it is possible to reduce the distance between the branch 15 and the exhaust gas outflow passage 33 and hence to achieve a compact structure of the device.

(2) Second Embodiment

Described below is the second embodiment. The second embodiment and other following embodiments comprise the same or equivalent configurations to the configuration of the first embodiment. Therefore, the second and other following embodiments will be described mainly with respect to differences. The same or equivalent points as in the first embodiment will be expressed with the same reference numbers in the drawing sheets and the description thereof will be omitted.

Figure 4:
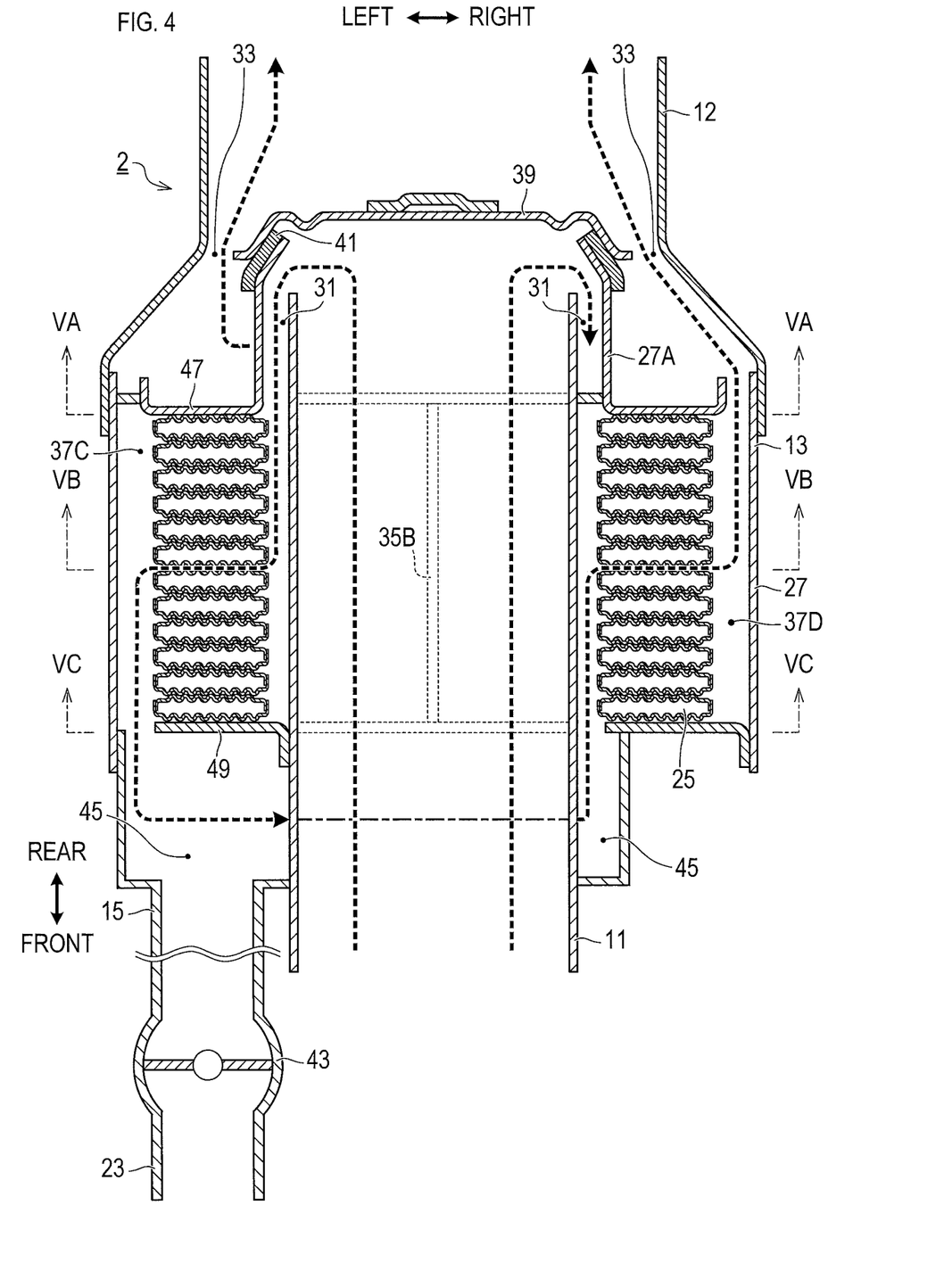
FIG. 4 is a cross sectional view illustrating an exhaust heat recovery device of a second embodiment cut horizontally with a flow passage changer valve and an EGR valve both being closed.

Like the first embodiment, an exhaust heat recovery device 2 illustrated in FIG. 4 is combined with the exhaust heat recovery function and the EGR cooling function. This exhaust heat recovery device 2 also includes the first exhaust gas conduit 11, the second exhaust gas conduit 12, the heat exchanger 13, the branch 15, the exhaust gas inflow passage 31, the exhaust gas outflow passage 33, the flow passage changeover valve 39, and the like. The structures and functions thereof are the same as in the first embodiment. However, the shape of the detail of the first exhaust gas conduit 11, the internal structure of the heat exchanger 13, the position of the branch 15, the position of the exhaust gas inflow passage 31, the position of the exhaust gas outflow passage 33, and the like are different from the first embodiment.

More specifically, according to the second embodiment, the end (rear end in FIG. 4) of the first exhaust gas conduit 11 is arranged inside the shell 27. Specifically, provided at the rear end of the shell 27 in FIG. 4 is a cylindrical portion 27A protruding cylindrically toward the rear. The rear end of the first exhaust gas conduit 11 is arranged at the inner peripheral side of the cylindrical portion 27A. The flow passage changeover valve 39 is configured to open and close an opening defined at the rear end of the cylindrical portion 27A (i.e., the rear end of the shell 27). Therefore, according to the second embodiment, the cushioning member 41 is also arranged at the rear end of the cylindrical portion 27A.

There is a clearance between the outer periphery of the first exhaust gas conduit 11 and the inner periphery of the cylindrical portion 27A so as to define the exhaust gas inflow passage 31. This exhaust gas inflow passage 31 communicates to the inside of the shell 27 within the left-side range from the center in the right and left direction in FIG. 4. Therefore, the exhaust gas can flow in within a range over the entire periphery between the outer periphery of the first exhaust gas conduit 11 and the inner periphery of the cylindrical portion 27A. However, the exhaust gas flowing into the clearance between the outer periphery of the first exhaust gas conduit 11 and the inner periphery of the cylindrical portion 27A within the right-side range from the center in the right and left direction in FIG. 4 flows in to the inside of the shell 27 after flowing in to the left-side range from the center in the right and left direction along the outer periphery of the first exhaust gas conduit 11.

The inside of the shell 27 is divided into the two division areas 37C and 37D by a partition 35B arranged approximately in parallel to the axial direction of the first exhaust gas conduit 11. Hereinafter, the division area 37C at the left side in FIG. 4 is also referred to as the left-side division area 37C, and the division area 37D at the right side in FIG. 4 is also referred to as the right-side division area 37D. The exhaust gas flowing in to the inside of the shell 27 flows to the left-side division area 37C at the inner peripheral side of the shell 27. The exhaust gas flowing into the left-side division area 37C flows to the outer peripheral side of the plates 25 from the inner peripheral side thereof in the left-side division area 37C. At this time, the exhaust gas contacts the plates 25 and heat exchange with the fluid in the plates 25 is carried out.

Provided at the end (front end in FIG. 4) of the shell 27 is a communication passage 45 which connects the left-side division area 37C to the right-side division area 37D. The exhaust gas flowing to the outer peripheral side of the plates 25 in the left-side division area 37C flows to the communication passage 45 at the outer peripheral side of the shell 27 and flows in to the right-side division area 37D at the inner peripheral side of the shell 27 via the communication passage 45. The exhaust gas flowing in to the right-side division area 37D flows from the inner peripheral side of the plates 25 to the outer peripheral side thereof in the right-side division area 37D. At this time, the exhaust gas contacts the plates 25 and the heat exchange with the fluid in the plates 25 is carried out. The exhaust gas flowing to the outer peripheral side of the plates 25 in the right-side division area 37D flows out to the inner peripheral side of the second exhaust gas conduit 12 at the outer peripheral side of the shell 27. The branch 15 is provided at the communication passage 45, in other words, the branch 15 is provided between the left-side division area 37C and the right-side division area 37D.

Figure 5A:
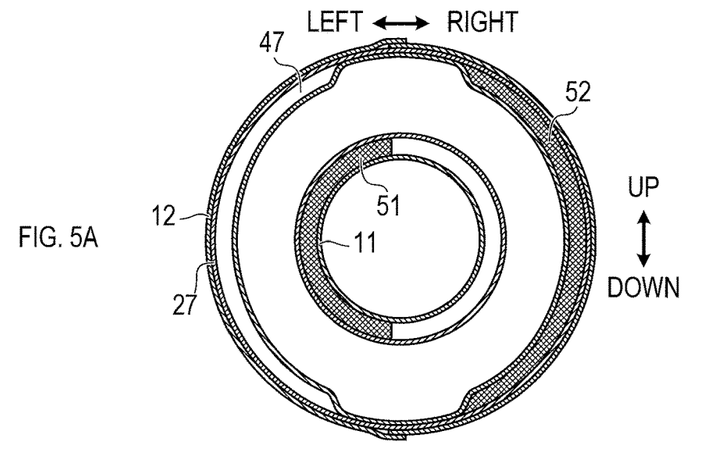
FIG. 5A is a cross sectional view of a cut position taken along VA-VA lines in FIG. 4.
Figure 5B:
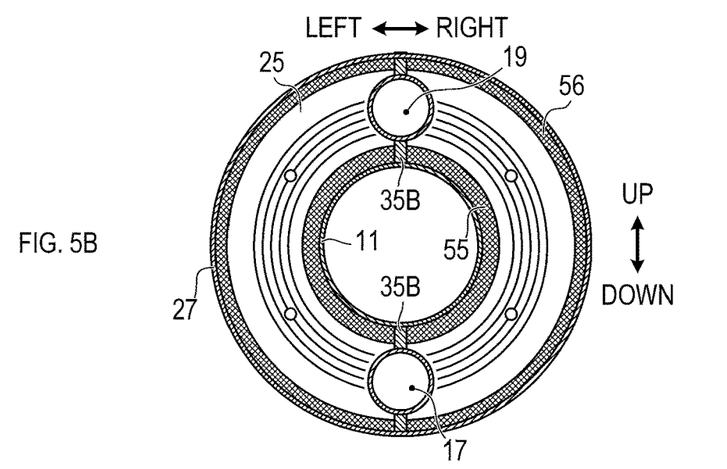
FIG. 5B is a cross sectional view of a cut position taken along VB-VB lines in FIG. 4.
Figure 5C:
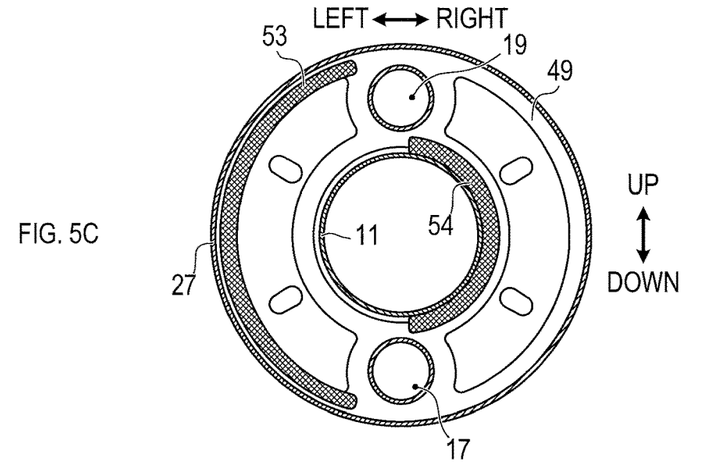
FIG. 5C is a cross sectional view of a cut position taken along VC-VC lines in FIG. 4.

In order to configure the flow passage described above, a first partition wall 47 illustrated in FIGS. 4 and 5A is provided at a back side of the shell 27. The above-described partition 35B is provided within the range where the plates 25 are arranged, as illustrated in FIGS. 4 and 5B. A second partition wall 49 as illustrated in FIGS. 4 and 5C is provided at the front side of the shell 27. The shaded sections in FIGS. 5A, 5B, and 5C are openings of the respective members.

As illustrated in FIG. 5A, the first partition wall 47 has openings 51 and 52 at their corresponding places respectively in order to flow in the exhaust gas from the outside of the shell 27 to the left-side division area 37C at the inner peripheral side of the shell 27 and to flow out the exhaust gas from the right-side division area 37D to the outside of the shell 27 at the outer peripheral side of the shell 27. As illustrated in FIG. 5C, the second partition wall 49 has openings 53 and 54 at their corresponding places respectively in order to flow out the exhaust gas from the left-side division area 37C to the communication passage 45 at the outer peripheral side of the shell 27 and to flow in the exhaust gas from the communication passage 45 to the right-side division area 37D at the inner peripheral side of the shell 27. As illustrated in FIG. 5B, a clearance 55 is provided between the inner peripheral side of the plates 25 and the outer periphery of the first exhaust gas conduit 11, and a clearance 56 is provided between the outer peripheral side of the plates 25 and the inner periphery of the shell 27. The clearances 55 and 56 are both divided by the partition 35B to the right and left in FIG. 5B.

According to the exhaust heat recovery device 2 configured as described above, under the condition wherein exhaust heat has been recovered actively, the flow passage changeover valve 39 is closed as illustrated in FIG. 4. In this case, almost all of the exhaust gas flowing in to the inner peripheral side of the first exhaust gas conduit 11 flows in to the heat exchanger 13 from the first exhaust gas conduit 11 via the exhaust gas inflow passage 31. Accordingly, heat recovery (i.e., fluid heating) and exhaust gas cooling are realized.

Figure 6A:
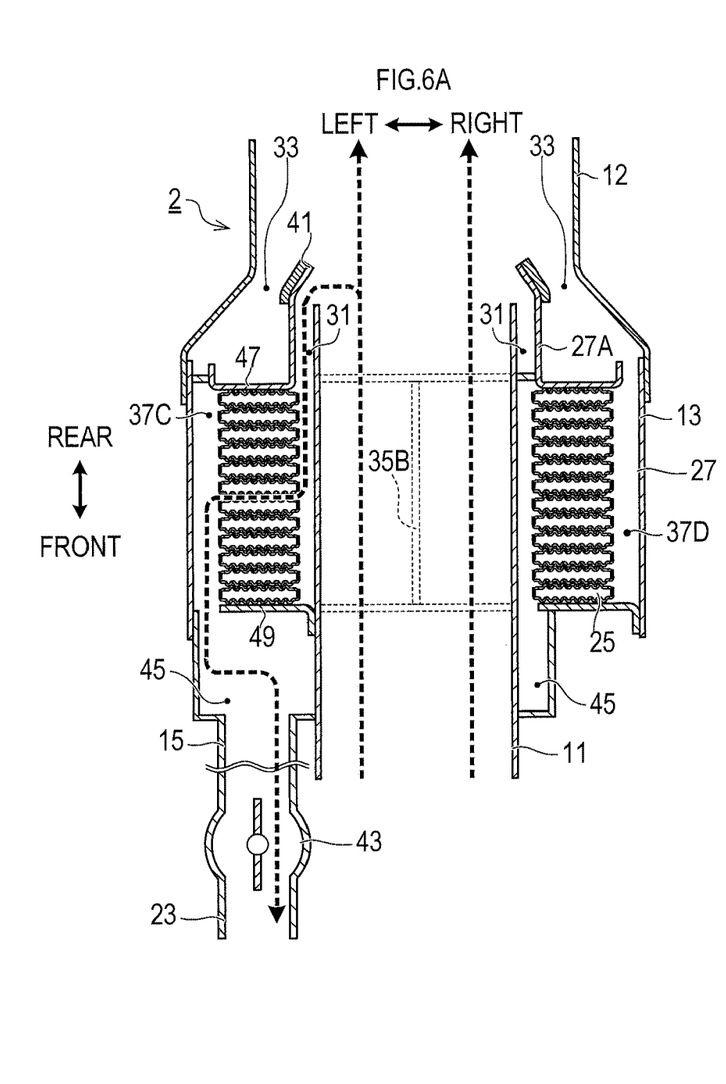
FIG. 6A is a cross sectional view illustrating the exhaust heat recovery device of the second embodiment cut horizontally with the flow passage changeover valve and the EGR valve both being open.

Meanwhile, under the condition wherein the exhaust gas is intended to be supplied to the exhaust gas recirculation flow passage 23, the EGR valve 43 is opened as illustrated in FIG. 6A. At this time, as denoted by an arrowed broken line in FIG. 6A, the exhaust gas cooled thorough the heat exchange by the heat exchanger 13 is supplied, partially or fully as needed, to the exhaust gas recirculation flow passage 23 via the branch 15. In this case, the heat exchanger 13 functions as an EGR cooler. Therefore, it is possible to suppress increase in the intake air temperature, and thus it is possible to inhibit decrease in filling efficiency of the intake air. When the flow passage changeover valve 39 is open, the exhaust gas not flowing in to the heat exchanger 13 flows out to the second exhaust gas conduit 12 directly from the first exhaust gas conduit 11. Although not illustrated in FIG. 6A, according to the opening degree of the EGR valve 43 or the flow rate of the exhaust gas flowing in from the exhaust gas inflow passage 31, the exhaust gas may be supplied only partially to the exhaust gas recirculation flow passage 23. In this case, the rest of the exhaust gas flows out to the inner peripheral side of the second exhaust gas conduit 12 via the exhaust gas outflow passage 33.

Figure 6B:
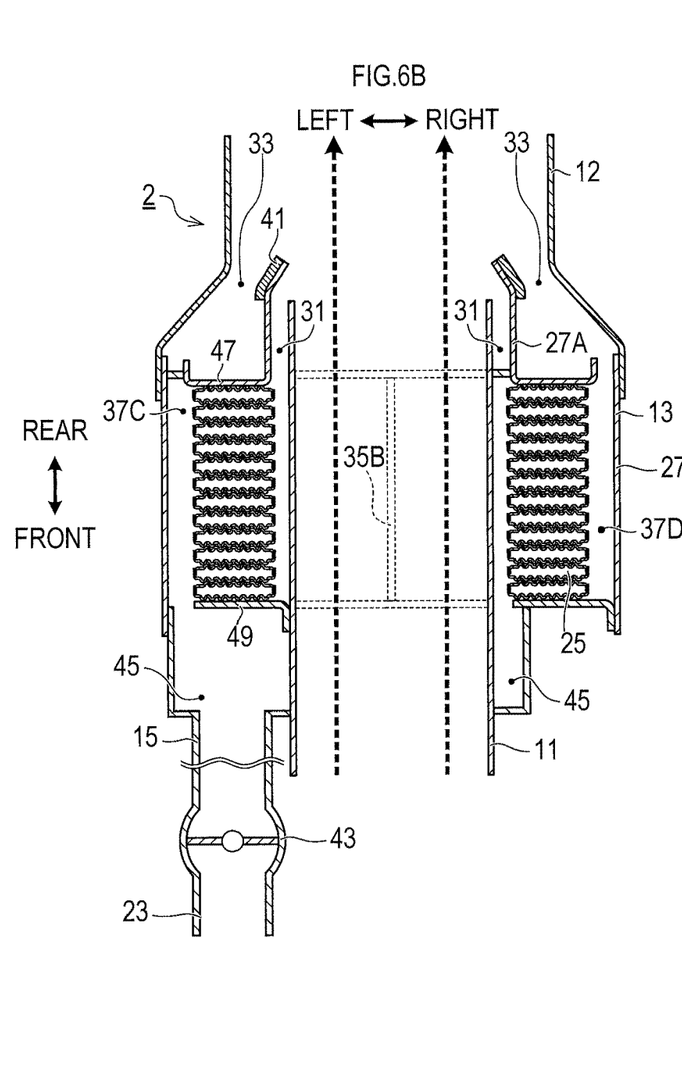
FIG. 6B is a cross sectional view illustrating the exhaust heat recovery device of the second embodiment cut horizontally with the flow passage changeover valve being open and the EGR valve being closed.

Further, under the condition wherein the exhaust gas is not supplied to the exhaust gas recirculation flow passage 23 and the heat recovery from the exhaust heat is not necessary, as illustrated in FIG. 6B, the EGR valve 43 is closed and the flow passage changeover valve 39 is opened. In this case, almost all of the exhaust gas flowing in to the inner peripheral side of the first exhaust gas conduit 11 flows out to the second exhaust gas conduit 12 directly from the first exhaust gas conduit 11.

When the amount of exhaust gas supplied to the inside of the shell 27 via the exhaust gas inflow passage 31 becomes too small relative to the amount of exhaust gas supplied to the exhaust gas recirculation flow passage 23, there is a possibility that high-temperature exhaust gas may flow in reverse from the second exhaust gas conduit 12 to the inside of the shell 27 via the exhaust gas outflow passage 33. However, even if the high-temperature exhaust gas flows in reverse from the second exhaust gas conduit 12 to the inside of the shell 27 via the exhaust gas outflow passage 33, such exhaust gas reaches the branch 15 after contacting the plates 25 at the right-side division area 37D. Accordingly, even if it is the exhaust gas flowing in reverse via the exhaust gas outflow passage 33, the exhaust gas is cooled through the heat exchange in association with the contact with the plates 25. Therefore, it is possible to inhibit high-temperature exhaust gas that has not been cooled through the heat exchange from flowing in to the exhaust gas recirculation flow passage 23. As a result, the increase in the intake air temperature is inhibited, and the reduction in the filling efficiency of the intake air is also inhibited.

Further, like the first embodiment, because the heat exchanger 13 is arranged coaxially about the first exhaust gas conduit 11, the mountability to the movable body is high and the degree of freedom to determine the position of the branch 15 is also high.

(3) Third Embodiment

Figure 7:
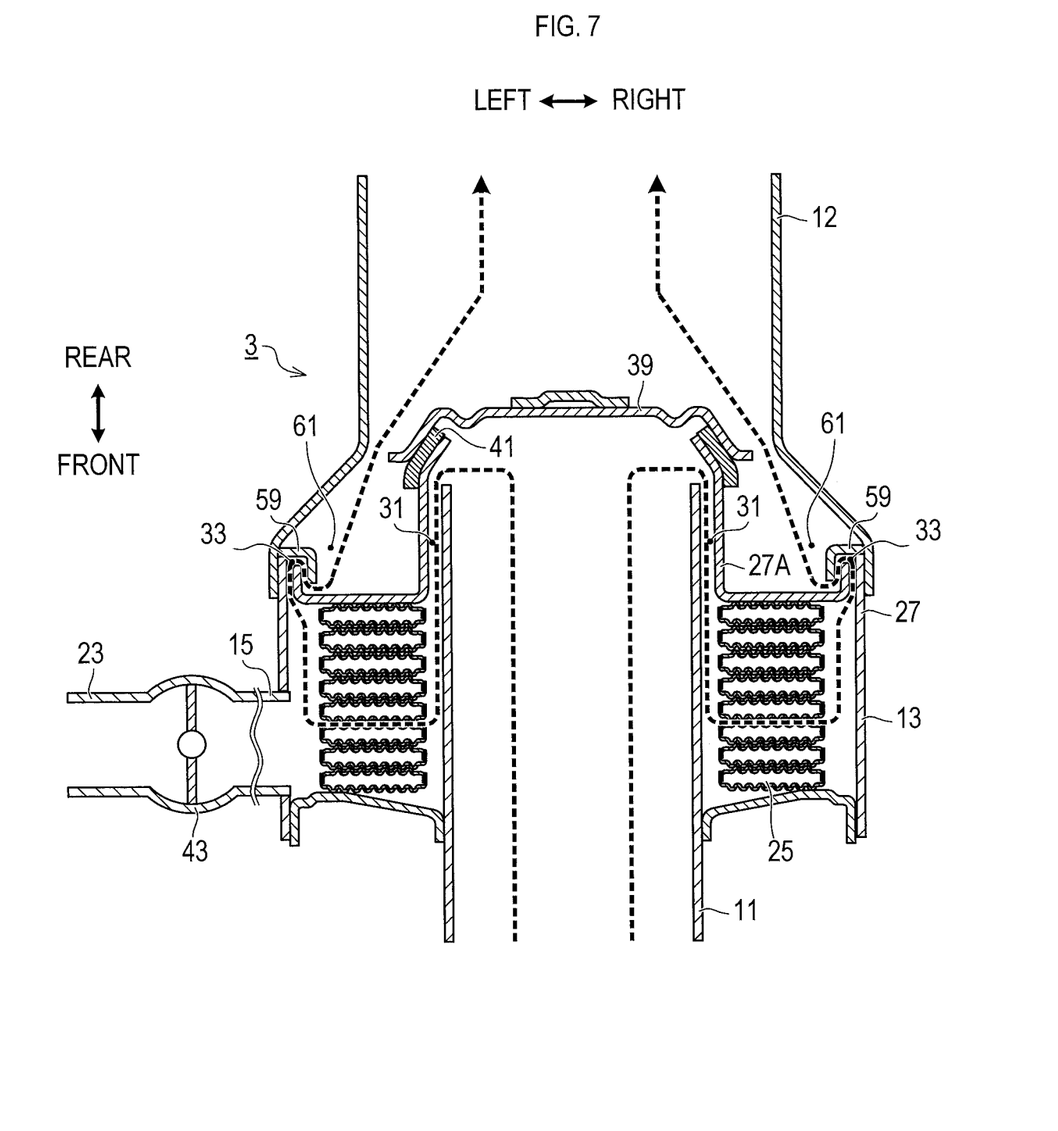
FIG. 7 is a cross sectional view illustrating an exhaust heat recovery device of a third embodiment cut horizontally with a flow passage changer valve and an EGR valve both being closed.

Described below is the third embodiment. Like the first and second embodiments, an exhaust heat recovery device 3 illustrated in FIG. 7 is combined with the heat recovery function and the EGR cooling function. This exhaust heat recovery device 3 also includes the first exhaust gas conduit 11, the second exhaust gas conduit 12, the heat exchanger 13, the branch 15, the exhaust gas inflow passage 31, the exhaust gas outflow passage 33, the flow passage changeover valve 39, and the like. The structures and functions thereof are the same as in the first embodiment. However, the shape of the detail of the first exhaust gas conduit 11, the internal structure of the heat exchanger 13, the position of the branch 15, the position of the exhaust gas inflow passage 31, the position of the exhaust gas outflow passage 33, and the like are different from the first and second embodiments.

More specifically, according to the third embodiment, there are eight pieces of the plates 25 arranged inside the shell 27. Therefore, the heat exchanger 13 of the third embodiment achieves a more compact structure for the axial directional dimension (front and rear directional dimension in FIG. 7) than the first and second embodiments. Like the first embodiment, the branch 15 is provided at the outer periphery of the shell 27. The structure near the end (rear end in FIG. 7) of the first exhaust gas conduit 11 is configured in the same manner as the second embodiment. That is, the third embodiment is the same as the second embodiment in that the cylindrical portion 7A is provided at the rear end of the shell 27, in that the rear end of the first exhaust gas conduit 11 is arranged at the inner peripheral side of the cylindrical portion 27A, in that the flow passage changeover valve 39 is configured to open and close the opening defined at the rear end of the cylindrical portion 27A, and the like.

The structure of the exhaust gas inflow passage 31 is similar to the structure of the second embodiment. However, according to the third embodiment, the exhaust gas inflow passage 31 is configured so that the exhaust gas flows in to the inside of the shell 27 within a range over the approximately entire periphery at the inner peripheral side of the shell 27. Accordingly, according to the third embodiment, flow passage resistance of the exhaust gas inflow passage 31 is lower than that of the second embodiment. According to the third embodiment, it is configured so that flow passage resistance of the exhaust gas outflow passage 33 is higher than that of the exhaust gas inflow passage 31.

More specifically, according to the third embodiment, a baffle plate 59 is provided at the place where the exhaust gas outflow passage 33 is configured so that the baffle plate 59 prevents the exhaust gas from flowing straight. Because of the presence of the baffle plate 59, the exhaust gas outflow passage 33 is configured to advance rearward in FIG. 7 inside the shell 27, bend in an inner peripheral direction (i.e., to the center of the first exhaust gas conduit 11) when abutting at the baffle plate 59, and bend forward in FIG. 7 when further abutting at the baffle plate 59. The exhaust gas outflow passage 33 then bends in the inner peripheral direction (i.e., to the center of the first exhaust gas conduit 11) when abutting the outer surface of the shell 27 (i.e., the end surface at rear side of the shell 27 in FIG. 7) and communicates with the outside of the shell 27 and a space 61 being the inner peripheral side of the second exhaust gas conduit 12.

According to the exhaust heat recovery device 3 configured as described above, under the condition wherein exhaust heat has been recovered actively, the flow passage changeover valve 39 is closed as illustrated in FIG. 7. In this case, almost all of the exhaust gas flowing in to the inner peripheral side of the first exhaust gas conduit 11 flows in to the heat exchanger 13 from the first exhaust gas conduit 11 via the exhaust gas inflow passage 31. Accordingly, heat recovery (i.e., fluid heating) and exhaust gas cooling are realized.

Figure 8A:
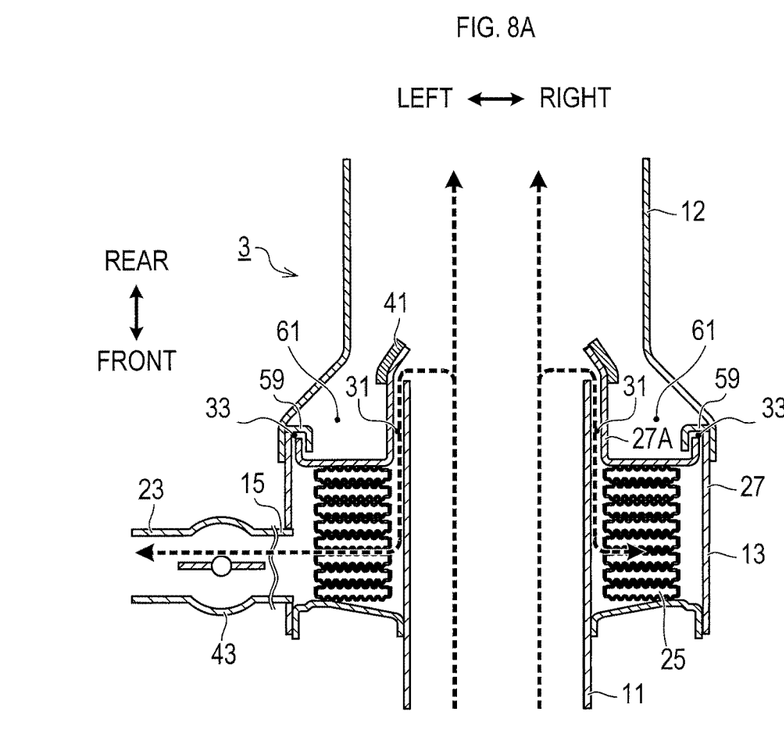
FIG. 8A is a cross sectional view illustrating the exhaust heat recovery device of the third embodiment cut horizontally with a flow passage changeover valve and an EGR valve both being open.

Meanwhile, under the condition wherein the exhaust gas is intended to be supplied to the exhaust gas recirculation flow passage 23, the EGR valve 43 is opened as illustrated in FIG. 8A. In this case, as denoted by an arrowed broken line in FIG. 8A, the exhaust gas cooled thorough the heat exchange by the heat exchanger 13 is supplied, partially or fully as needed, to the exhaust gas recirculation flow passage 23 via the branch 15. In this case, the heat exchanger 13 functions as an EGR cooler. Therefore, it is possible to suppress increase in the intake air temperature, and thus it is possible to inhibit decrease in filling efficiency of the intake air. When the flow passage changeover valve 39 is open, the exhaust gas not flowing in to the heat exchanger 13 flows out to the second exhaust gas conduit 12 directly from the first exhaust gas conduit 11. Although not illustrated in FIG. 8A, according to the opening degree of the EGR valve 43 or the flow rate of the exhaust gas flowing in via the exhaust gas inflow passage 31, the exhaust gas may be supplied only partially to the exhaust gas recirculation flow passage 23. In this case, the rest of the exhaust gas flows out to the inner peripheral side of the second exhaust gas conduit 12 via the exhaust gas outflow passage 33.

Figure 8B:
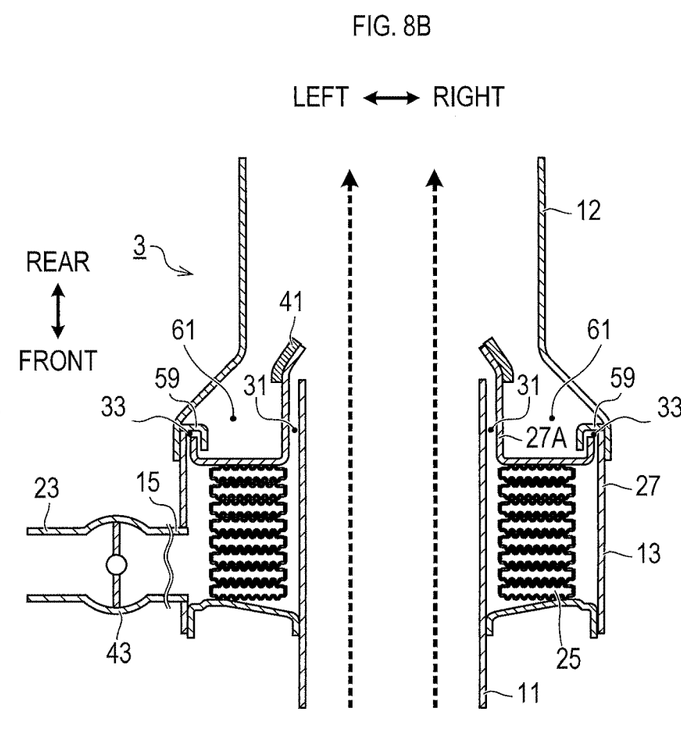
FIG. 8B is a cross sectional view illustrating the exhaust heat recovery device of the third embodiment cut horizontally with the flow passage changeover valve being open and the EGR valve being closed.

Further, under the condition wherein the exhaust gas is not supplied to the exhaust gas recirculation flow passage 23 and the heat recovery from the exhaust heat is not necessary, as illustrated in FIG. 8B, the EGR valve 43 is closed and the flow passage changeover valve 39 is opened. In this case, almost all of the exhaust gas flowing in to the inner peripheral side of the first exhaust gas conduit 11 flows out to the second exhaust gas conduit 12 directly from the first exhaust gas conduit 11.

When the amount of exhaust gas supplied to the inside of the shell 27 via the exhaust gas inflow passage 31 becomes too small relative to the amount of exhaust gas supplied to the exhaust gas recirculation flow passage 23, there is a possibility that high-temperature exhaust gas may flow in reverse from the second exhaust gas conduit 12 to the inside of the shell 27 via the exhaust gas outflow passage 33. However, as described above, the exhaust gas outflow passage 33 is a narrow flow passage configured to be bent several times, and the exhaust gas inflow passage 31 is configured so that the exhaust gas flows in to the exhaust gas inflow passage 31 remarkably more easily than to the exhaust gas outflow passage 33.

Accordingly, the high-temperature exhaust gas is more unlikely to flow in reverse from the second exhaust gas conduit 12 to the inside of the shell 27 via the exhaust gas outflow passage 33. Therefore, even if there is a reverse flow of the exhaust gas at the exhaust gas outflow passage 33, inside of the shell 27, a percentage of the exhaust gas that flows in through the exhaust gas inflow passage 31 and passed through the heat exchanger 13 becomes large, and a percentage of the exhaust gas that flows in through the exhaust gas outflow passage 33 and has not passed through the heat exchanger 13 becomes small.

Therefore, by adjusting the flow passage resistances of the exhaust gas inflow passage 31 and the exhaust gas outflow passage 33 and optimizing the balance as described above, it is possible to inhibit the high-temperature exhaust gas not subjected to the heat exchanger 13 from flowing excessively into the exhaust gas recirculation flow passage 23. As a result, it is possible to suppress the increase in the intake air temperature and the reduction in the filling efficiency of the intake air.

Further, like the first and second embodiments, because the heat exchanger 13 is arranged coaxially about the first exhaust gas conduit 11, the mountability to the movable body is high.

(4) Other Embodiments

The exhaust heat recovery device was described with exemplary embodiments. However, the above embodiments are examples of the present disclosure. That is, the present disclosure shall not be limited to the exemplary embodiments and is carried out by various modes within the technical scope of the present disclosure.

For example, according to the second embodiment, the inside of the shell 27 is divided into left and right, as an example. However, by rotating the divisional structure at 90 degrees about the axis extending in the front and rear direction, the inside of the shell 27 is configured to be divided into up and down. Accordingly, the inside of the shell 27 may be configured to be divided into up and down.

Further, according to the first and second embodiments, there are two division areas provided inside the shell 27, as an example. However, three or more division areas may be provided inside of the shell 27, and the exhaust gas may pass through the division areas in order. Even in this case, regarding the branch 15, it is configured so that at least one division area is arranged at the upstream side of the exhaust gas flow passage as viewed from the branch 15 and at least one division area is arranged at the downstream side of the exhaust gas flow passage as viewed from the branch 15. As a result, even if the exhaust gas flows in reverse via the exhaust gas inflow passage 31, it is possible to inhibit the high-temperature exhaust gas from reaching the branch 15.

Still further, according to the first embodiment, the specific quantity regarding the number of the plates 25 included in the respective two division areas is described as an example. However, the plates 25 may be included in each division area in any quantities.

Still further, according to the above-described embodiments, exemplary material, shape, configuration and the like of the components of the exhaust heat recovery device of the present disclosure were described above. However, these are not limited to the above-described embodiments. For example, a place embodied by a single component according to the above embodiments may be configured to be achieved by a plurality of components. Alternatively, a place embodied by a plurality of components according to the above embodiments may be configured to be achieved by a single component. Further, within a range not to fully damage the function, the above described example configurations of the embodiments may be partially omitted. At least a part of the configurations of one embodiment may be added to or replaced by the configurations of the other embodiments. Further, at least a part of the configurations of the above embodiments may be replaced by a conventional configuration having the same function.

The invention claimed is:

1. An exhaust heat recovery device comprising:
a first exhaust gas conduit having an inner peripheral side to which exhaust gas from an internal combustion engine flows in;
a second exhaust gas conduit that is positioned at a downstream side from the first exhaust gas conduit in an exhaust gas flowing direction;
a heat exchanger that carries out heat exchange between the exhaust gas flowing in from the first exhaust gas conduit and a fluid as a heated object;
a valve that is configured to change a flow ratio between a flow rate of the exhaust gas flowing out to the second exhaust gas conduit from the first exhaust gas conduit not being subjected to the heat exchanger and a flow rate of the exhaust gas flowing in to the heat exchanger from the first exhaust gas conduit; and
a branch that branches the exhaust gas subjected to the heat exchange with the fluid by the heat exchanger partially or fully to an exhaust gas recirculation flow passage that recirculates the exhaust gas to an intake system of the internal combustion engine;
wherein the heat exchanger comprises a plurality of plates respectively configured to be annular and hollow and arranged at positions surrounding an outer periphery of the first exhaust gas conduit and a shell provided at a position surrounding the outer periphery of the first exhaust gas conduit and housing the plurality of plates therein,
a flow passage for the fluid as the heated object is configured inside the plurality of plates so that the fluid is supplied to insides of the respective plates via a fluid supply passage and the fluid is discharged from the insides of the respective plates via a fluid discharge passage, and
wherein the heat exchanger is configured so that, at a place inside of the shell and outside of the plurality of plates, the exhaust gas flows in from the first exhaust gas conduit via an exhaust gas inflow passage and is flows out to the second exhaust gas conduit via an exhaust gas outflow passage,
wherein the inside of the shell is divided into a plurality of division areas, each of the division areas houses at least one plate of the plurality of plates therein, and a flow passage for the exhaust gas inside the shell is configured so that the exhaust gas flowing in from the exhaust gas inflow passage reaches the branch after contacting the plate in at least one of the plurality of division areas and the exhaust gas not branched to the exhaust gas recirculation flow passage at the branch flows out to the second exhaust gas conduit after contacting the plate in at least one of the plurality of division areas,
wherein, in a first division area of the plurality of division areas, the exhaust gas flowing in from the exhaust gas inflow passage passes a first space defined between an outer periphery of the first exhaust gas conduit and an inner periphery of the plate to a second space defined between an outer periphery of the plate and an inner periphery of the shell and thereafter, in a second division area of the plurality of division areas, the exhaust gas passes again between the outer periphery of the plate and the inner periphery of the plate, passes through the exhaust gas outflow passage, and flows out to the second exhaust gas conduit, and
wherein the branch is arranged in a position facing the second space.

2. The exhaust heat recovery device according to claim 1, wherein the inside of the shell is divided into two division areas by a partition arranged approximately perpendicularly to an axial direction of the first exhaust gas conduit.

3. The exhaust heat recovery device according to claim 1, wherein the inside of the shell is divided into two division areas by a partition arranged approximately in parallel to an axial direction of the first exhaust gas conduit.

4. The exhaust heat recovery device according to claim 2, wherein the partition extends radially outward from the first exhaust gas conduit,
wherein the two division areas include:
a rear-side division area including a rear set of plates of the plurality of plates; and
a front-side division area including a front set of plates of the plurality plates, and
wherein the branch extends from an area overlapping the partition in the second space.

5. The exhaust heat recovery device according to claim 4, wherein the rear set plates consists of a larger number of plates than the front set of plates.

6. The exhaust heat recovery device according to claim 3, wherein the partition extends from an outer peripheral surface of the first exhaust gas conduit to an inner peripheral surface of the shell,
wherein the two division areas include:
a left-side division area in which left halves of plates of the plurality of plates are housed; and
a right-side division area in which right halves of plates of the plurality of plates are housed, and
wherein the branch extends from a communication passage that provides communication from the left-side division area to the right-side division area.

7. An exhaust heat recovery device, comprising:
a first conduit that includes:
a rear portion; and
a central axis,
a changeover valve that is located rearward of the first conduit,
a second conduit that is located coaxial with and rearward of the first conduit,
a heat exchanger that has a substantially annular shape, the heat exchanger being located coaxial with the first conduit and surrounding the rear portion of the first conduit, and the heat exchanger including:
a plurality of plates that has an annular shape and is configured such that a cooling fluid flows therethrough;

a shell that surrounds the plurality of plates; and a partition that extends radially outward from the rear portion of the first conduit, the partition being arranged to divide the inside of the heat exchanger into:

a front-side division area including a front set of plates of the plurality of plates, and a rear-side division area including a rear set of plates of the plurality of plates, wherein the plurality of plates are surrounded by:

the rear portion of the first conduit as an internal cylindrical surface;

the shell as an external cylindrical surface;

a front wall that extends inwardly from a front end of the shell and creates an exhaust gas inflow passage; and a rear wall that extends inwardly from a rear end of the shell and creates an exhaust gas inflow passage, and wherein the exhaust heat recovery device further comprises a branch that extends from the shell at a location overlapping the partition, the branch being in communication with an Exhaust Gas Recirculation (EGR) valve.

8. The exhaust heat recovery device according to claim 7, wherein the exhaust gas inflow passage includes a hole created by an outer flange in the first conduit at a location forward of the plurality of plates, such that hot exhaust gas passes into the heat exchanger when the changeover valve is closed.

9. The exhaust heat recovery device according to claim 7, wherein the rear set of plates comprises approximately twice as many plates as the front set of plates.

10. An exhaust heat recovery device, comprising:

a substantially cylindrical shell;

a plurality of plates that has an annular shape and is located in the shell, each plate of the plurality of plates including a corresponding left half and a right half;

a first conduit that includes:

a central axis;

a front portion that is located frontward of the plurality of plates;

a central portion that is located radially inward of the plurality of plates; and a rear portion that is located rearward of the plurality of plates, a second conduit that is located coaxial with and rearward of the first conduit;

a heat exchanger that includes the plurality of plates;

a changeover valve that is located rearward of the first conduit;

a cylindrical portion that is located coaxially around the rear portion and defines an exhaust gas inflow passage through which hot exhaust gas passes frontward from the first conduit toward the plurality of plates when the changeover valve is closed;

a partition that divides the heat exchanger into a left-side division area and a right-side division area;

a first partition wall that extends radially outward from a front end of the cylindrical portion and substantially defines a rear end of the heat exchanger, the first partition wall creating a rear inner opening between the front end of the cylindrical portion and the first conduit in a left half of the exhaust heat recovery device, such that the hot exhaust gas passes frontward into the left-side division area;

a rear inner seal that provides a sealing between the front end of the cylindrical portion and the first conduit in a right half of the exhaust heat recovery device; and a second partition wall that defines a front end of the heat exchanger, wherein a left section of the second partition wall extends radially outward from the first conduit, wherein a right section of the second partition wall extends radially inward from the shell, wherein the left section of the second partition wall and the shell create a front outer opening therebetween, wherein the right section of the partition wall and the first conduit create a front inner opening therebetween, wherein the front outer opening is created such that partially cooled exhaust gas passes frontward out of the left-side division area into a communication passage that provides communication from the left-side division area to the right-side division area, wherein the front inner opening is created such that the partially cooled exhaust gas passes rearward from the communication passage into the right-side division area, then the partially cooled exhaust has is fully cooled by passing radially outward among right halves of the plurality of plates, and then fully cooled exhaust gas passes rearward from a rear outer opening to the second conduit, and wherein the exhaust heat recovery device further comprises a branch that extends from the communication passage to an Exhaust Gas Recirculation (EGR) valve such that some of the partially cooled exhaust gas are recirculated to an engine.

* * * * *

UNITED STATES PATENT AND TRADEMARK OFFICE
CERTIFICATE OF CORRECTION

PATENT NO.        : 10,605,207 B2
APPLICATION NO.   : 15/760946
DATED             : March 31, 2020
INVENTOR(S)       : Shirai et al.

Page 1 of 1

It is certified that error appears in the above-identified patent and that said Letters Patent is hereby corrected as shown below:

In the Claims

Claim 1, Column 17, Lines 56-57, replace "and is flows out" with --and flows out--.

Claim 7, Column 19, Line 18, replace "creates an exhaust gas inflow passage" with --creates an exhaust gas outflow passage--.

Claim 10, Column 20, Line 38, replace "partially cooled exhaust has is" with --partially cooled exhaust gas is--.

Signed and Sealed this
Second Day of June, 2020

Andrei Iancu
*Director of the United States Patent and Trademark Office*